United States Patent

[11] 3,543,627

[72] Inventor Joseph D. Hearns
3603 Breaker, Drayton Plains, Michigan 48020
[21] Appl. No. 816,940
[22] Filed April 17, 1969
[45] Patented Dec. 1, 1970

[54] MACHINE FOR CUTTING FLEXIBLE MATERIAL ACCURATELY BOTH LINEARLY AND VERTICALLY
5 Claims, 5 Drawing Figs.
[52] U.S. Cl. .................................................. 83/455,
30/294; 83/460, 83/468; 269/87.2
[51] Int. Cl. ................................................... B26d 7/02
[50] Field of Search ....................................... 30/294,
290, 287, 292, 293; 269/87.2, 87.1; 83/455, 456, 459, 460, 467, 468; 33/32

[56] References Cited
UNITED STATES PATENTS

| 2,065,380 | 12/1936 | Lamson | 83/455 |
| 2,531,149 | 11/1950 | Melchor | 83/455 |
| 2,759,544 | 8/1956 | DeVries | 30/294 |
| 3,195,340 | 7/1965 | Zunich | 83/455X |
| 3,394,457 | 7/1968 | Holder | 30/294 |

Primary Examiner—Frank T. Yost
Attorney—William T. Sevald

ABSTRACT: A machine for cutting thick flexible material accurately both linearly and vertically comprising paired spaced lower bars defining a cutting blade guide channel therebetween with their top surfaces engaging the material, superposed paired spaced upper bars defining a cutting blade guide channel therebetween with their bottom surfaces engaging the material in opposition to the lower bars, springs normally urging the upper and lower bars toward one another to clamp the material therebetween, and a cam lever pivotally mounted on one set of bars and reacting against the other set of bars to move one set of bars away from the other set of bars to allow insertion of material therebetween; whereupon when the material is inserted and the lever is released, the springs urge the bars into clamping engagement with the material; and a cutter blade and holder slidable on the top bars with the blade lying in the guide channels of both sets of bars so that upon manual linear movement of the blade and holder the material is cut off accurately both linearly and vertically with the bars guiding the blade linearly and vertically and holding the material against movement both linearly and transversely.

Patented Dec. 1, 1970
3,543,627
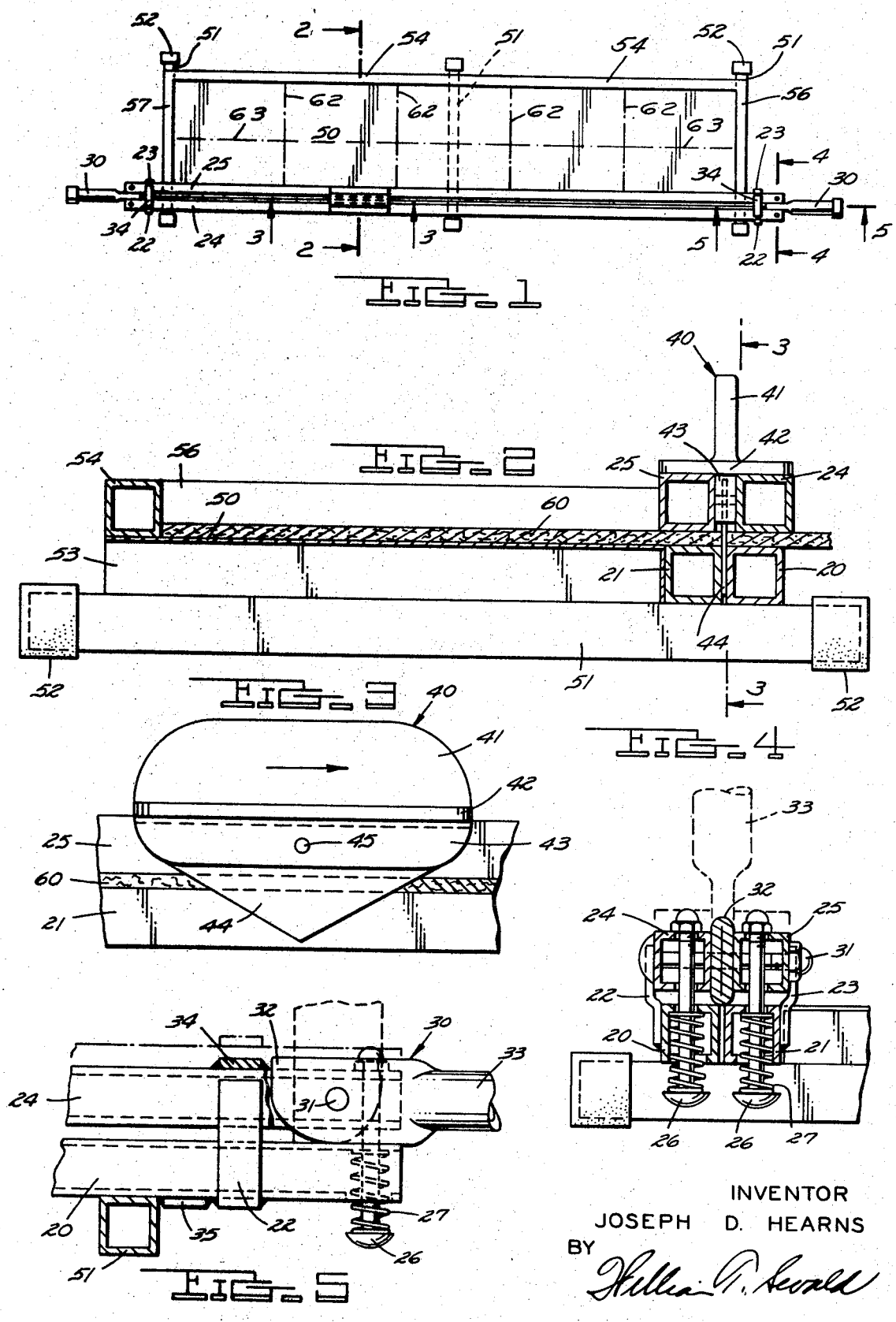
INVENTOR
JOSEPH D. HEARNS
BY
ATTORNEY

MACHINE FOR CUTTING FLEXIBLE MATERIAL ACCURATELY BOTH LINEARLY AND VERTICALLY

This invention relates to a machine for cutting off relatively thick flexible material, such as a laminate consisting of a rubber foam pad, a fibre glass layer and extending carpet fibers, accurately both linearly and vertically including means for accurate handling, locating and measuring; means for accurately holding and clamping; and means for accurately cutting.

The several devices in the prior art which shear or cut have not proven entirely satisfactory on thick flexible material not only because they are complicated in design and construction, expensive to manufacture, and difficult to use but also because, first, shearing action on relatively thick flexible material causes the material to walk or move linearly and vertically producing a curving or slanting line of shear vertically and/or linearly, and, second, because cutting action on relatively thick flexible material causes the cutter and/or material to move or wander also producing a slanting or curving line of cut vertically and linearly.

With the foregoing in view, it is a primary object of the invention to provide means for cutting thick flexible material which is simple in design and construction, inexpensive to manufacture, and easy to use, and which eliminates the moving or walking of the thick flexible material and the wandering of the cutter relative to one another so as to produce a straight line of cut both vertically and linearly.

An object of the invention is to provide two sets of paired spaced bars which act as combined guide track and clamp beams and which embody a combination of purposes and results wherein the bars support, locate, and position the material; clamp and hold the material without linear or vertical distortion; act as a blade and/or blade holder guide track linearly and vertically, and which act as a blade holder slide track absorbing the downward force in the vector of the applied force so that only the transverse cutting force is applied to the blade cutting the material thereby, in the combination of the features, producing an accurate thick flexible material cutoff both linearly and vertically.

An object of the invention is to provide a set of paired spaced lower bars which act as material support beams in the clamping and cutting action on both sides of the cut and which act as a blade guide on both sides of the blade in cutting.

An object of the invention is to provide a set of paired spaced upper bars alined with and lying over the lower bars and which act as material securing and support beams in opposition to the lower bars in the clamping and cutting action on both sides of the cut, which act as a blade guide by guiding the blade holder on both sides of the blade, and which provide a blade holder slide track.

An object of the invention is to provide a blade holder and blade for use in conjunction with the upper and lower bars wherein the holder is supported vertically by the upper bars and slidingly supported by the upper bars for linear movement and wherein the blade, through the holder, is laterally guided on both sides of the cut by the upper bars and wherein the blade is directly laterally guided on both sides of the cut by the lower bars so as to produce an accurate cut vertically and linearly.

An object of the invention is to provide spring means normally forcing the upper bars toward the lower bars for clamping the material therebetween and levers for moving the upper bars against the springs away from the lower bars to create a material-receiving space therebetween for inserting and positioning the material between the upper and lower bars and, so that by releasing the levers, the spring means urge the upper bars toward the lower bars clamping the material.

An object of the invention is to provide a plate adjacent the lower bars at the same level to provide a material handling and measuring table surface.

An object of the invention is to provide material stops and/or grid lines on the plate for measuring and/or squaring the material relative to the line of cut between the bars.

These and other objects of the invention will become apparent by reference to the following description of the machine embodying the invention taken in connection with the accompanying drawing, in which:

FIG. 1 is a top plan view of a preferred embodiment of the machine;

FIG. 2 is an enlarged cross-sectional view of the machine shown in FIG. 1, taken on the line 1–1 thereof, showing the blade holder and blade in elevation;

FIG. 3 is a cross-sectional view, with parts broken away of a portion of the machine taken on the line 3–3 of FIG. 2, showing the blade holder and blade in elevation as indicated by the arrows 3–3 of FIG. 1;

FIG. 4 is an enlarged cross-sectional view, with parts broken away, of a portion of the machine shown in FIG. 1, taken on the lines 4–4 thereof, showing the compressing springs and cam lever in more detail and showing the clamped position in solid lines and the raised position in broken line; and FIG. 5 is an enlarged cross-sectional view, with parts broken away, of the machine shown in FIG. 1, taken on the line 5–5 thereof, showing the compressing springs and cam lever in more detail and showing the clamped position in solid lines and the raised position in broken lines.

Referring now to the drawing, wherein like numerals refer to like and corresponding parts throughout the several views, the preferred embodiment of the machine disclosed therein to illustrate the invention comprises a set of paired, interconnected, spaced lower bars 20 and 21. The spacing between the bars 20 and 21 is relatively small such as for slidably receiving a thin cutting blade in close sidewise sliding confinement. Two sets of paired arms 22 and 23 are welded to the lower bars 20, 21 adjacent their opposite ends; the arms 22 and 23 have upwardly projecting guide portions. A set of paired, interconnected, spaced upper bars 24 and 25 are slidably positioned between the guide portions of the arms 22 and 23 in overlying relationship to the lower bars 20 and 21. The upper bars 24 and 25 may be spaced as the lower bars to receive only a blade or be more widely spaced as shown to receive a web of a blade holder. Bolts 26 lead through both ends of each upper bar 24, 25 and through both ends of each lower bar 20, 21. A compressed spring 27 is located on each bolt 26 between the bolthead and the lower bars 20, 21. A nut 28 on the bolt 26 abuts each upper bar 24, 25. The spring 27 and bolt 26 thus urge the upper and lower bars toward each other at both ends of each bar. Two levers 30 are pivoted by a fulcrum pin 31 at either end on one set of bars, such as the upper bars 24, 25, as shown. Each lever 30 has a short cam end 32 for engaging the other set of bars, such as the lower bars 20, 21 as shown, and a long handle end 33. Each lever 30 has a rest position as seen in solid lines in FIGS. 1, 4 and 5 with the cam end 32 out of engagement. Each lever 30 has an actuated position as shown in broken lines in FIGS. 4 and 5, with the cam end 32 engaging the lower bars 20, 21 forcing the upper bars 25, 26 upwardly away from the lower bars 20, 21 to create receiving space for the material 60 therebetween. After the material 60 is inserted between the set of upper bars 25, 26 and the set of lower bars 20, 21 and located as desired, the levers 30 are returned to the rest position and the springs 27 urge the sets of bars into forced engagement with the material to securely clamp the material in location as positioned, FIG. 2.

The bolts 26 and springs 27 allow sufficient endwise movement of the upper bars 24, 25 in the upward movement effected by the levers 30 and the guide portions of the arms 22 and 23 maintain the lateral alinement of the bars relative to one another at all times. The upper bars 24, 25 are interconnected by the welded strips 34 and the lower bars 20, 21 are interconnected by the welded strips 35 at both ends of each set. Of course spacers may be welded between the paired bars at their ends to connect them together if desired.

A blade holder 40 has a hand grip 41, a skid plate 42, and a blade-mounting slotted web 43. A blade 44 is attached to the web 43 as by insertion in a slot therein and a securing screw 45. The holder skid plate 42 rests on the top surface of the upper bars 24, 25 as a slide surface. The holder web 43 lies between the upper bars 24, 25 in close but free confinement laterally and freely linearly. The holder web 43 supports and alines the blade 44 to a point adjacent the material 60. The blade 44 extends past the material 60 to a point between the lower bars 20, 21 in close but free lateral confinement and freely linearly.

When the operator moves the blade holder 40 linearly on the upper bars 24, 25, the blade 44 moves through the material 60 with not only the blade 44 closely guided laterally but also the material closely clamped laterally of the blade 44 so that neither can move laterally and so that only the blade can move linearly thereby cutting the material 60 accurately both linearly and vertically.

A plate 50 is connected to the lower bars 20, 21 as by a plurality of crosslegs 51 which are equipped with antiskid friction pads 52. Spacers 53 support the plate 50 at the level of the top surface of the lower bars 20, 21 above the plane of the crosslegs 51. The plate 50 provides a work table surface.

A rear stop strip 54 is mounted on the plate 50 parallel to the bars 20, 21, and 24, 25 and preferably at a measured distance from the line of cut between the bars. This enables a user to abut the material against the rear stop strip 54 and cut off a piece of known size. Side or end stop strips 56 and 57 are mounted on the plate 50 and lie normal to the line of cut between the bars. The side or end stop strips 56, 57 facilitate squaring material relative to the line of cut and/or to the rear stop strip 54. The rear stop strip 54 may be distancewise adjustable relative to the line of cut in the plate 50 in conjunction with bolts and thumb nuts adjustably movable in slots in the plate 50. The plate 50 may also have lateral grid lines 62 and linear grid lines 63 at measured distance and angle relative to the line of cut for measuring and alining material relative to the line of cut.

In operation, the user positions the machine on a supporting surface such as a floor, a table, the back end of a truck, etc. and moves the levers 30 to their actuated position elevating the set of upper bars 25, 26 and inserts the material 60 as indicated by the broken lines of FIGS. 4 and 5, as previously stated. By abutting the edge of the material 60 against the rear stop strip 54 and the side edge of the material 60 against a side stop strip 56 or 57, the user may measure off and square a known length of material. This is particularly useful in cutting leftover or scrap lengths of material into usable squares of tilelike size such as 12 inches, 8 inches, or 6 inches. In this way a carpet company may salvage the scrap by producing usable squares. Moreover a user may cut new stock into squares for the same purpose. The squares may be of different color or pattern. Obviously the rear stop strip 54 may be bypassed by the leading edge of material and the material extended to any desired measured length, squared against the side stop strip 56 or 57, and an accurate straight line cutoff made both vertically and linearly.

In this connection, the accuracy of the vertical cut is important because when thick material is not cut accurately vertically, upon abutting the cut edges, upper and lower voids will develop thus exposing the strata of the carpet or not having lower strata support respectively. Also if the cut is not on a square and accurate straight line linearly, the edges will not match leaving voids or causing overlap.

The machine as disclosed and described constitutes a neat-appearing, lightweight, portable, accurate, linear and vertical cutoff device which may be operated rapidly without loss of accuracy thereby saving time and money and producing the highest quality work.

While many changes may be made in the size, shape, detail and arrangement of the various elements of the invention, the scope of the invention is only defined by the appended claims.

I claim:

1. A lightweight, readily transportable machine for accurately, easily, and quickly measuring, holding, and cutting sheet material such as fabrics, laminates, carpeting, etc., comprising:

paired, interconnected, spaced cutter blade guide channel forming and material-clamping lower bars; said lower bars having a material engaging top surface; said lower bars being only slightly spaced apart to provide a closely confining cutter blade guide channel therebetween;

paired, relatively vertically movable, interconnected, spaced cutter blade guide channel forming and material-clamping upper bars overlying said lower bars; said upper bars having a material-engaging bottom surface opposing said lower bars top surface; said upper bars being spaced apart sufficiently to provide a closely confining cutter blade guide channel therebetween;

both said lower and upper bars having opposite ends adjacent one another;

spring means positioned between said lower bars and said upper bars at their adjacent opposite ends normally urging said bottom surface of said upper bars against said top surface of said lower bars with clamping force;

guide arms fixed on one said upper and lower bars and slidably engaging the other said upper and lower bars for holding said upper bars in alinement with said lower bars including during vertical movement of said upper bars relative to said lower bars;

a lever pivotally mounted on said upper bars at one said end and a lever pivotally mounted on said upper bars at the other said end;

each said lever having a cam surface on one side of the fulcrum for engaging said lower bars and a handle on the other side of the fulcrum for manually operating each said lever;

said levers having a normal rest position with said cam surfaces out of engagement;

said levers by manually swinging said handles moving from the rest position to the actuated position with said cam portion engaging said lower bars and moving said upper bars away from said lower bars through further compressing said springs to create a material-receiving space between said upper bars and said lower bars;

a cutter blade holder having a bottom skid surface for slidably engaging said top slide surface on said upper bars and a blade-holding portion;

a blade secured to said holder extending downwardly therefrom and lying in said guide channels between said bars; and the sheet material so clamped and held being cuttable by manually moving said blade holder and blade linearly along said upper bars with said skid surface of said holder sliding on said top slide surface of said upper bars absorbing the downward force imposed by the manual movement with the linear force imposed moving said blade linearly through the material to cut it with said upper and lower bars guiding said blade in an accurate straight line linearly and holding said blade in an accurate straight line vertically as it moves linearly to cut the material accurately both linearly and vertically.

2. In a machine as set forth in claim 1, a plate fixed adjacent said lower bars; said plate having a top surface substantially on the plane of said lower bars top surface; said plate providing a tablelike area for positioning and locating material relative to said bars and guide channels as defined by said upper and lower bars; said plate having a back edge parallel to said bars and side edges normal thereto.

3. In a machine as set forth in claim 2, a back stop strip on said plate top surface adjacent said plate back edge; said back stop strip lying parallel to said guide channels defined by said lower and upper bars for accurately locating an edge of the material parallel with said guide channels; and side stop strips on said plate top surface adjacent said plate side edges lying normal to said guide channels defined by said lower and upper bars for accurately locating an edge of the material normal to said guide channels.

4. In a machine as set forth in claim 2, said plate having at least one linear grid line paralleling said blade guide channels for alining an edge of the material parallel to said blade guide channels and at least one grid line normal to said guide channels for alining an edge of the material normal to said blade guide channels; said linear grid line being located at a known distance from said guide channels centerline for measuring the length of material cutoff.

5. In a machine as set forth in claim 2, support cross members below said lower bars and said plate and at least one spacer member between said plate and said cross members:

said cross members rigidly interconnecting and supporting said bars and plate with said plate and bars material-engaging surfaces in a level plane; and friction cushion pads on said cross members for resiliently and antiskidingly engaging a supporting surface such as a floor or a work table.